(12) United States Patent
Baek et al.

(10) Patent No.: US 11,481,470 B2
(45) Date of Patent: Oct. 25, 2022

(54) FAST FOURIER TRANSFORM DEVICE FOR ANALYZING SPECIFIC FREQUENCY COMPONENTS OF INPUT SIGNAL

(71) Applicant: Electronics and Telecommunications Research Institute, Daejeon (KR)

(72) Inventors: Youngseok Baek, Daejeon (KR); Ik Soo Eo, Daejeon (KR); Bon Tae Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 72 days.

(21) Appl. No.: 16/897,774

(22) Filed: Jun. 10, 2020

(65) Prior Publication Data

US 2020/0394251 A1 Dec. 17, 2020

(30) Foreign Application Priority Data

Jun. 14, 2019 (KR) ........................ 10-2019-0070791

(51) Int. Cl.
*G06F 17/14* (2006.01)
(52) U.S. Cl.
CPC .................................. *G06F 17/142* (2013.01)
(58) Field of Classification Search
CPC .............................. G06F 17/142; G06F 17/141
See application file for complete search history.

(56) References Cited

U.S. PATENT DOCUMENTS

| | | | |
|---|---|---|---|
| 5,163,017 A | 11/1992 | Wong et al. | |
| 5,606,575 A * | 2/1997 | Williams | H04B 1/38 |
| | | | 370/484 |
| 6,424,986 B1* | 7/2002 | Li | G06F 17/148 |
| | | | 708/400 |
| 7,233,968 B2* | 6/2007 | Kang | G06F 17/142 |
| | | | 708/404 |
| 7,702,712 B2 | 4/2010 | Krishnamoorthi et al. | |
| 7,831,649 B2 | 11/2010 | Cho et al. | |
| 10,739,687 B2* | 8/2020 | Smilde | G03F 7/70633 |
| 2001/0037366 A1* | 11/2001 | Webb | H04L 29/06 |
| | | | 709/204 |
| 2014/0365547 A1 | 12/2014 | Kim et al. | |
| 2020/0274608 A1* | 8/2020 | Luo | H04B 7/0862 |

FOREIGN PATENT DOCUMENTS

KR 10-0250428 4/2000
KR 10-2018-0058166 5/2018

* cited by examiner

*Primary Examiner* — Chuong D Ngo
(74) *Attorney, Agent, or Firm* — Kile Park Reed & Houtteman PLLC

(57) ABSTRACT

Provided is a fast Fourier transform device for analyzing specific frequency components of an input signal. The fast Fourier transform device includes an address generator that generates an address, based on a first frequency index corresponding to a first frequency, an FFT coefficient table that outputs a first Fourier transform coefficient corresponding to the generated address among Fourier transform coefficients of the first frequency index, and an operator that calculates a frequency characteristic of an input signal associated with the first frequency, based on the input signal and the first Fourier transform coefficient.

14 Claims, 11 Drawing Sheets

| Coefficient Index | Real Part Coefficient | Imaginary Part Coefficient |
|---|---|---|
| IX1 | $c_r(0)$ | $c_i(0)$ |
| IX2 | $c_r(1)$ | $c_i(1)$ |
| ⋮ | ⋮ | ⋮ |
| IX16 | $c_r(15)$ | $c_i(15)$ | addr (4-bit) →

| Coefficient Index | Real Part Coefficient | Imaginary Part Coefficient |
|---|---|---|
| IX1 | $c_r(0)$ | $c_i(0)$ |
| IX2 | $c_r(1)$ | $c_i(1)$ |
| IX3 | $c_r(2)$ | $c_i(2)$ |
| IX4 | $c_r(3)$ | $c_i(3)$ | paddr (2-bit) →

| Coefficient Index | Real Part Coefficient | Imaginary Part Coefficient |
|---|---|---|
| IX1 | $c_r(0)$ | $c_i(0)$ |
| IX2 | $c_r(1)$ | $c_i(1)$ | paddr (1-bit) →

→ $c_t$

FAST FOURIER TRANSFORM DEVICE FOR ANALYZING SPECIFIC FREQUENCY COMPONENTS OF INPUT SIGNAL

CROSS-REFERENCE TO RELATED APPLICATIONS

This U.S. non-provisional patent application claims priority under 35 U.S.C. § 119 of Korean Patent Application No. 10-2019-0070791, filed on Jun. 14, 2019, the entire contents of which are hereby incorporated by reference.

BACKGROUND

Embodiments of the inventive concept relate to a semiconductor device, and more particularly, relate to a fast Fourier transform device for analyzing specific frequency components of an input signal.

Frequency components of an input signal may be analyzed using a fast Fourier transform (FFT). This signal processing technique is used in various fields such as communication. In the related art, research has been conducted on a hardware structure and method for efficiently analyzing various frequency components of the input signal. For example, a hardware structure that performs a butterfly operation for the fast Fourier transform is used.

However, in some technical fields, such as a field of body composition analysis, analysis of only a few frequency components of an input signal may be required. In these technical fields, in the case of using a conventional hardware structure for performing the butterfly operation, all frequency components of the input signal may be analyzed. In this case, since only some of the frequency components required among the analyzed frequency components are used, it may be inefficient.

SUMMARY

Embodiments according to the inventive concept provide a fast Fourier transform device capable of efficiently analyzing specific frequency components of an input signal.

A fast Fourier transform device according to an embodiment of the inventive concept includes an address generator that generates an address, based on a first frequency index corresponding to a first frequency, an FFT coefficient table that outputs a first Fourier transform coefficient corresponding to the generated address among Fourier transform coefficients of the first frequency index, and an operator that calculates a frequency characteristic of an input signal associated with the first frequency, based on the input signal and the first Fourier transform coefficient.

According to an embodiment, the address generator may sequentially increase a value of the generated address, based on a value of the first frequency index.

According to an embodiment, the number of the generated address may be the same as the number of the input signal.

According to an embodiment, the number of the Fourier transform coefficients stored in the FFT coefficient table may be the same as the number of the input signal.

According to an embodiment, each of the Fourier transform coefficients may include a real part coefficient and an imaginary part coefficient.

According to an embodiment, when the input signal includes a plurality of signals, the operator may calculate the frequency characteristic, based on a multiplication result of a first signal corresponding to the first Fourier transform coefficient among the plurality of signals and the first Fourier transform coefficient.

A fast Fourier transform device according to an embodiment of the inventive concept includes an address generator that generates an address, based on a first frequency index corresponding to a first frequency, and generates a transform address corresponding to the generated address, an FFT coefficient table that outputs a first candidate coefficient corresponding to the generated transform address among Fourier transform coefficients of the first frequency index, coefficient selection logic that outputs a first Fourier transform coefficient, based on the first candidate coefficient or a preset coefficient depending on bit information of the generated address, and an operator that calculates a frequency characteristic of an input signal associated with the first frequency, based on the input signal and the first Fourier transform coefficient.

According to an embodiment, the address generator may sequentially increase a value of the generated address, based on a value of the first frequency index.

According to an embodiment, the number of the generated address may be the same as the number of the input signal.

According to an embodiment, the number of the Fourier transform coefficients stored in the FFT coefficient table may be less than the number of the input signal.

According to an embodiment, the address generator may generate the transform address by using remaining bits except for an upper 2-bit of the generated address, based on the upper 2-bit of the generated address.

According to an embodiment, the bit information of the generated address may include upper 2-bit information of the generated address and zero bit information indicating whether all of remaining bits except for the upper 2-bit are 0.

According to an embodiment, the coefficient selection logic may output the first Fourier transform coefficient, based on the first candidate coefficient when at least one of the remaining bits is not 0, and may output the first Fourier transform coefficient, based on the preset coefficient when all of the remaining bits are 0.

According to an embodiment, when the input signal includes a plurality of signals, the operator may calculate the frequency characteristic, based on a multiplication result of a first signal corresponding to the first Fourier transform coefficient among the plurality of signals and the first Fourier transform coefficient.

BRIEF DESCRIPTION OF THE FIGURES

The above and other objects and features of the inventive concept will become apparent by describing in detail exemplary embodiments thereof with reference to the accompanying drawings.

FIG. 7 is a diagram illustrating an FFT coefficient table of FIG. 5.

FIG. 10 is a diagram illustrating an FFT coefficient table of FIG. 8.

FIG. 12 is a diagram illustrating another example of an FFT coefficient table of FIG. 8.

DETAILED DESCRIPTION

Embodiments of the inventive concept will be described below in more detail with reference to the accompanying drawings. In the following descriptions, details such as detailed configurations and structures are provided merely to assist in an overall understanding of embodiments of the inventive concept. Modifications of the embodiments described herein can be made by those skilled in the art without departing from the spirit and scope of the inventive concept. Furthermore, descriptions of well-known functions and structures are omitted for clarity and brevity. The terms used in this specification are defined in consideration of the functions of the inventive concept and are not limited to specific functions. Definitions of terms may be determined based on the description in the detailed description.

In the following drawings or the detailed description, modules or components may be connected to others in addition to the components illustrated in drawing or described in the detailed description. The modules or components may be directly or indirectly connected. The modules or components may be communicatively connected or may be physically connected.

Unless defined otherwise, all terms including technical and scientific terms used herein have the same meaning as can be understood by one of ordinary skill in the art to which the inventive concept belongs. Generally, terms defined in the dictionary are interpreted to have equivalent meaning to the contextual meanings in the related art and are not to be construed as having ideal or overly formal meaning unless expressly defined in the text.

Figure 1:
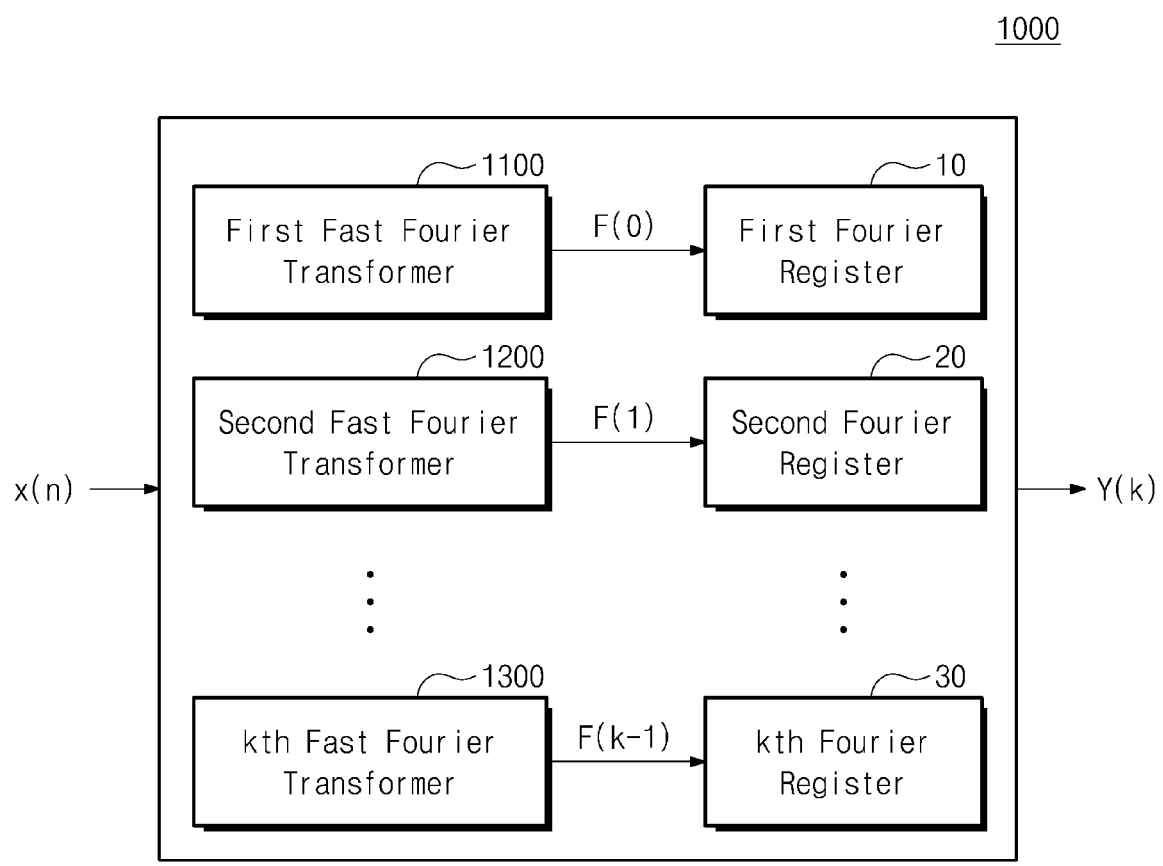
FIG. 1 is a block diagram of a fast Fourier transform device according to an embodiment of the inventive concept.

FIG. 1 is a block diagram of a fast Fourier transform device according to an embodiment of the inventive concept. Referring to FIG. 1, a fast Fourier transform device 1000 may receive an input signal x(n) and may output an output signal Y(k) that is a fast Fourier transform value of the input signal x(n). The input signal x(n) may include a plurality of signals. For example, the input signal x(n) may include N signals x(0), x(1), . . . , x(N−1). The output signal Y(k) may be a specific frequency component F(k) of the input signal x(n) corresponding to a frequency index "k". Here, the frequency index "k" may correspond to a specific frequency value. For example, the frequency index 0 may correspond to a frequency value of 0. The frequency index 1 may correspond to a fundamental frequency value, the frequency index 2 may correspond to a frequency value that is twice the fundamental frequency. In this case, a frequency component F(0) may be a frequency component of a frequency of 0, a frequency component F(1) may be a frequency component of the fundamental frequency.

In detail, the fast Fourier transform device 1000 may sequentially receive the input signal x(n) (e.g., x(0) to x(N−1)). Here, the number N of input signal x(n) may vary depending on the number of an FFT point. The fast Fourier transform device 1000 may calculate k specific frequency components F(0) to F(k−1), based on the input signal x(n). The fast Fourier transform device 1000 may output one of the calculated specific frequency components F(0) to F(k−1) as the output signal Y(k). Here, the frequency index "k" may be much less than the number N of the input signal x(n). That is, the fast Fourier transform device 1000 may calculate only the desired k frequency components F(0) to F(k−1) among the N frequency components.

The fast Fourier transform device 1000 may include first to kth fast Fourier transformers 1100 to 1300 and first to kth Fourier registers 10 to 30. Each of the fast Fourier transformers 1100 to 1300 may calculate a frequency component F(k) of a corresponding frequency index "k" (i.e., a preset frequency index "k"). For example, the first fast Fourier transformer 1100 may calculate the frequency component F(0) of the frequency index 0, and the second fast Fourier transformer 1200 may calculate the frequency component F(1) of the frequency index 1.

The calculated frequency component F(k) may be stored in a corresponding Fourier register. For example, the frequency component F(0) may be stored in the first Fourier register 10, and the frequency component F(1) may be stored in the second Fourier register 20. The frequency component F(k) stored in one of the first to kth Fourier registers 10 to 30 may be output as the output signal Y(k).

For example, in a bioelectrical impedance analysis (BIA) device for analyzing a body composition of a person, the fast Fourier transform device 1000 may be used. The BIA device may only require some frequency components of a current flowing through body parts. For example, the BIA device may only need k specific frequency components of an input current. Accordingly, the BIA device may obtain only the specific frequency components desired by using the fast Fourier transform device 1000.

In FIG. 1, although each of the fast Fourier transformers 1100 to 1300 is described as calculating the frequency component of the preset specific frequency (i.e., the preset frequency index "k"), the inventive concept is not limited thereto. For example, the fast Fourier transform device 1000 may include one fast Fourier transformer. In this case, one fast Fourier transformer may receive one of the "k" frequency indices "k" and may calculate a frequency component depending on the input frequency index "k".

Hereinafter, for convenience of explanation, it is assumed that each of the fast Fourier transformers 1100 to 1300 calculates a frequency component of the preset frequency index "k", accordingly, an operation of each of the fast Fourier transformers 1100 to 1300 will be described in detail.

Figure 2:
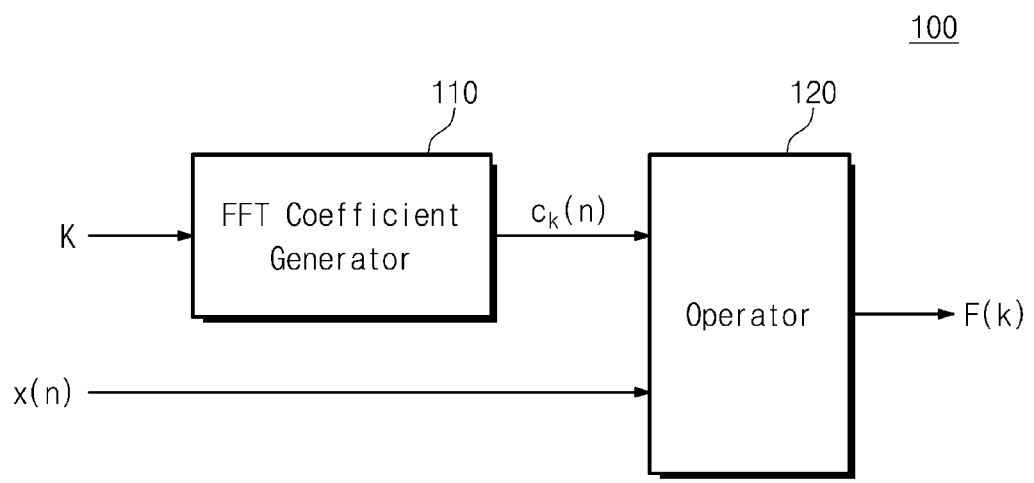
FIG. 2 is a block diagram illustrating a fast Fourier transformer of FIG. 1.

FIG. 2 is a block diagram illustrating a fast Fourier transformer of FIG. 1. Referring to FIG. 2, a fast Fourier transformer 100 may calculate the frequency component F(k) of the preset frequency index "k", based on the input signal x(n). The fast Fourier transformer 100 may calculate the frequency component F(k), based on Equation 1 below.

$$F(k) = \sum_{n=0}^{N-1} c_k(n)x(n) \quad \text{[Equation 1]}$$

According to Equation 1, the frequency component F(k) may be calculated based on the input signal x(n) and a coefficient $c_k(n)$ corresponding to the input signal x(n). In more detail, multiplication results of the input signal x(n) and the corresponding coefficient $c_k(n)$ may be added to calculate the frequency component F(k). When the input signal x(n) includes N signals, the coefficient $c_k(n)$ may include N coefficients. Here, the coefficient $c_k(n)$ may be expressed by Equation 2 below.

$$c_k(n) = \cos\left(\frac{2\pi k}{N}n\right) - j\sin\left(\frac{2\pi k}{N}n\right) \quad \text{[Equation 2]}$$

According to Equation 2, the coefficient $c_k(n)$ may include a real part and an imaginary part. The real part may be represented by a cosine value, and the imaginary part may be represented as a sine value. For example, the coefficient $c_k(1)$ may include $$\cos\left(\frac{2\pi k}{N}\right)$$

as a real part coefficient and $$-\sin\left(\frac{2\pi k}{N}\right)$$

as an imaginary part coefficient.

The fast Fourier transformer 100 includes an FFT coefficient generator 110 and an operator 120. The FFT coefficient generator 110 may generate the coefficient $c_k(n)$, based on the preset frequency index "k" inside the fast Fourier transformer 100. Specifically, the FFT coefficient generator 110 may sequentially generate the coefficient $c_k(n)$ such that the coefficient $c_k(n)$ corresponding to the input signal x(n) is generated. For example, when the input signal x(n) is provided in an order of x(0), x(1), . . . , and x(N−1), the FFT coefficient generator 110 may generate the coefficient $c_k(n)$ in an order of $c_k(0)$, $c_k(1)$, . . . , and $c_k(N−1)$. The generated coefficient $c_k(n)$ may be provided to the operator 120.

The operator 120 may calculate the frequency component F(k) by performing the operation of Equation 1, based on the received input signal x(n) and the coefficient $c_k(n)$. The operator 120 may include a multiplier and accumulator (MAC) operator for the operation of Equation 1. Specifically, the operator 120 may multiply the input signal x(n) and the coefficient $c_k(n)$ that are sequentially input, and may accumulate the multiplication results to calculate the frequency component F(k).

Figure 3:
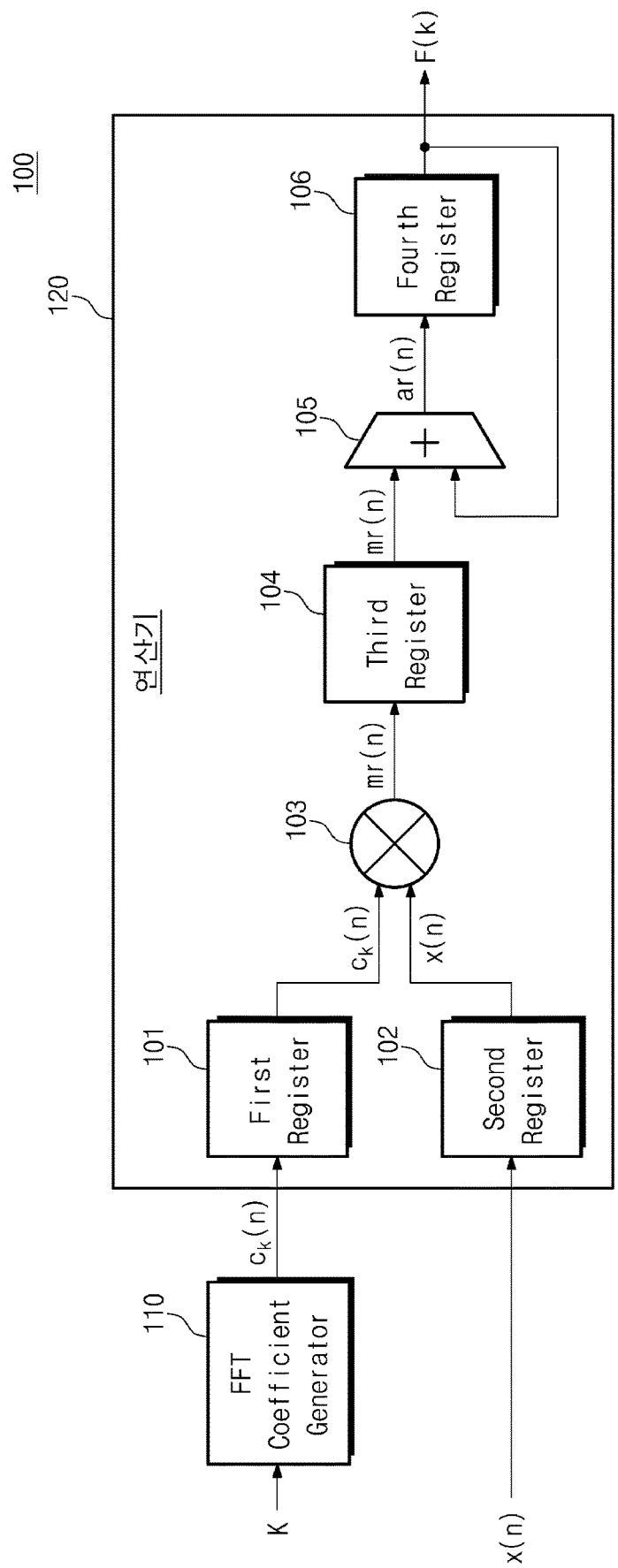
FIG. 3 is a diagram illustrating a pipeline structure of a fast Fourier transformer of FIG. 2.

FIG. 3 is a diagram illustrating a pipeline structure of a fast Fourier transformer of FIG. 2. Referring to FIG. 3, the operator 120 may include a first register 101, a second register 102, a multiplier 103, a third register 104, an adder 105, and a fourth register 106.

The first register 101 may store the coefficient $c_k(n)$ output from the FFT coefficient generator 110, and the second register 102 may store the input signal x(n). In this case, the coefficient $c_k(n)$ stored in the first register 101 may correspond to the input signal x(n) stored in the second register 102. For example, the coefficient $c_k(1)$ may be stored in the first register 101 and the input signal x(1) may be stored in the second register 102.

The multiplier 103 may generate a multiplication result mr(n) by multiplying the coefficient $c_k(n)$ output from the first register 101 by the input signal x(n) output from the second register 102. The third register 104 may store the output multiplication result mr(n). For example, when the coefficient $c_k(n)$ is a complex number, the multiplier 103 may perform a complex multiplication.

The adder 105 may generate a cumulative result ar(n) by adding the multiplication result mr(n) output from the third register 104 to a value stored in the fourth register 106. For example, when a first multiplication result mr(0) is output from the third register 104, since a value stored in the fourth register 106 does not exist, the adder 105 may output the first multiplication result mr(0) as a cumulative result ar(0). Then, when a second multiplication result mr(1) is output from the third register 104, the adder 105 may calculate an accumulative result ar(1) by adding the second multiplication result mr(1) to the cumulative result ar(0) output from the fourth register 106. Thus, when N multiplication results mr(n) are accumulated, the fourth register 106 may output the frequency component F(k) of Equation 1. For example, when the multiplication result mr(n) is a complex number, the adder 105 may perform a complex addition.

In FIG. 3, the operator 120 is illustrated as including the four registers 101, 102, 104, and 106, but the inventive concept is not limited thereto. For example, the operator 120 may include more than the four registers. In this case, the operator 120 may include registers such that the coefficient $c_k(n)$ and the input signal x(n) corresponding to each other are provided to the multiplier 103.

Figure 4:
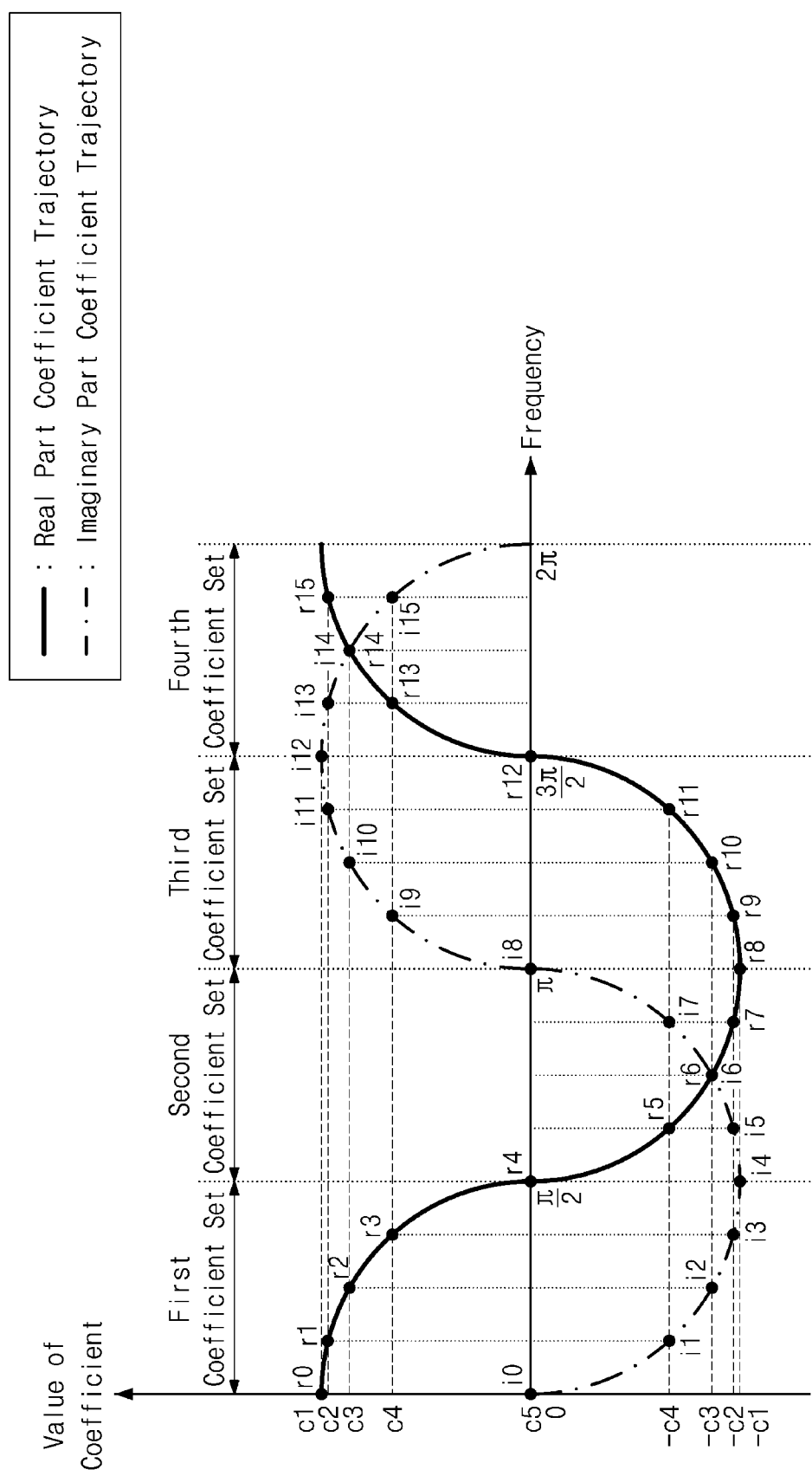
FIG. 4 is a diagram illustrating coefficients output from an FFT coefficient generator of FIG. 2.

FIG. 4 is a diagram illustrating coefficients output from an FFT coefficient generator of FIG. 2. A horizontal axis in FIG. 4 represents a frequency, and a vertical axis represents a coefficient value. Referring to FIG. 4, a real part coefficient trajectory and an imaginary part coefficient trajectory of the coefficient $c_k(n)$ that is output from the FFT coefficient generator 110 are illustrated. As described with reference to Equation 2, the real part coefficient is represented by the cosine value, and the imaginary part coefficient is represented by the sine value having an inverse sign. For example, when the frequency index "k" is 1, the real part coefficient may be one of cosine values of one period (i.e., $2\pi$), and the imaginary part coefficient may be one of sine values having the inverse sign of one period (i.e., $2\pi$). When the frequency index "k" is 2, the real part coefficient may be one of cosine values of two periods (i.e., $4\pi$), and the imaginary part coefficient may be one of sine values having the inverse sign of two periods (i.e., $4\pi$). In this case, the real part coefficient value and the imaginary part coefficient value may be repeated depending on the period. Therefore, in FIG. 4, the coefficient $c_k(n)$ is described based on one cycle.

As illustrated in FIG. 4, the coefficient $c_k(n)$ may be classified into first to fourth coefficient sets. The first coefficient set includes coefficients $c_k(n)$ of which frequencies are 0 or more and less than $\pi/2$, and the second coefficient set includes coefficients $c_k(n)$ of which frequencies are $\pi/2$ or more and less than $\pi$. The third coefficient set includes coefficients $c_k(n)$ of which frequencies are $\pi$ or more and less than $3\pi/2$, and the fourth coefficient set includes coefficients $c_k(n)$ of which frequencies are $3\pi/2$ or more and less than $2\pi$.

For example, when the frequency index "k" is 1 and the number N of the input signal x(n) is 16, the real part coefficient may have coefficient values corresponding to 16 points r0 to r15 on the real part coefficient trajectory, and the imaginary part coefficient may have coefficient values corresponding to 16 points i0 to i15 on the imaginary part coefficient trajectory. In the real part coefficient value, the first coefficient set may include coefficient values c1, c2, c3, and c4 of the real part and coefficient values c5, −c4, −c3, and −c2 of the imaginary part, and the second coefficient set may include coefficient values c5, −c4, −c3, and −c2 of the real part and coefficient values −c1, −c2, −c3, and −c4 of the imaginary part. The third coefficient set may include coefficient values −c1, −c2, −c3, and −c4 of the real part and coefficient values c5, c4, c3, and c2 of the imaginary part, and the fourth coefficient set may include coefficient values c5, c4, c3, and c2 of the real part and coefficient values c1, c2, c3, and c4 of the imaginary part. Here, c1 may be 1 and c5 may be 0.

As such, the coefficient values of the coefficient $c_k(n)$ may have properties of a trigonometric function having symmetry and periodicity. Accordingly, coefficient values of another coefficient set may be obtained from coefficient values of one coefficient set.

Figure 5:
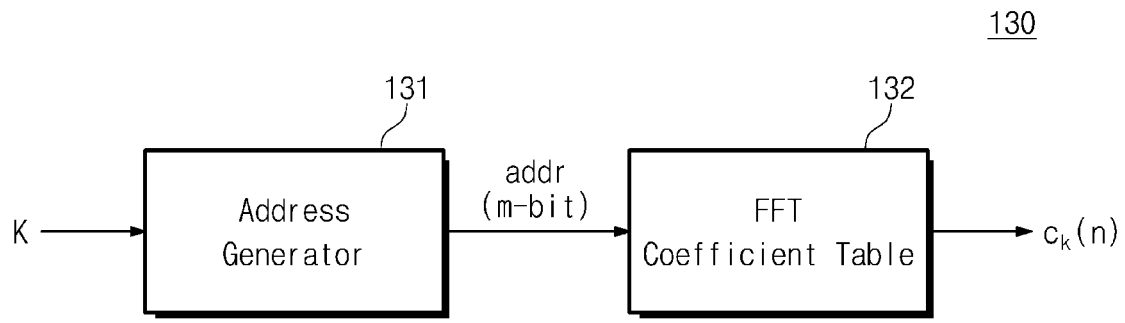
FIG. 5 is a block diagram illustrating an FFT coefficient generator of FIG. 2.

FIG. 5 is a block diagram illustrating an FFT coefficient generator of FIG. 2. Referring to FIG. 5, an FFT coefficient generator 130 may include an address generator 131 and an FFT coefficient table 132. The address generator 131 may generate an address addr, based on the frequency index "k". The address addr may indicate a position of the coefficient $c_k(n)$ stored in the FFT coefficient table 132. The address addr generated from the address generator 131 may be generated in m-bit. Here, the m-bit may vary depending on the number of the coefficients $c_k(n)$ stored in the FFT coefficient table 132. For example, when 16 coefficients $c_k(n)$ are stored in the FFT coefficient table 132, the address generator 131 may generate 4-bit address addr.

In detail, the address generator 131 may sequentially increase a value of the address addr that is generated based on the value of the frequency index "k". For example, when the frequency index "k" is 1 and the number N of the input signal x(n) is 16, the address generator 131 may increase the value of the address addr that is generated from 0 to 15 by one. For example, when the frequency index "k" is 2, the number N of the input signal x(n) is 16, and the number of bits of the address addr is 4-bit, the address generator 131 may increase the value of the generated address addr by 2 from 0. In this case, when the value of the address addr exceeds 15, the address generator 131 may generate the address addr again as 0, and sequentially increase the address addr from 0.

The FFT coefficient table 132 may store the coefficient $c_k(n)$ of the frequency index "k" in advance. For example, the FFT coefficient table 132 may store the coefficient $c_k(n)$ of the frequency index 1 in advance, but the inventive concept is not limited thereto.

The FFT coefficient table 132 may output the coefficient $c_k(n)$ corresponding to the address addr. When the address addr is sequentially provided from the address generator 131 depending on the number N of the input signal x(n), the FFT coefficient table 132 may sequentially output the corresponding coefficient $c_k(n)$.

Figure 6:
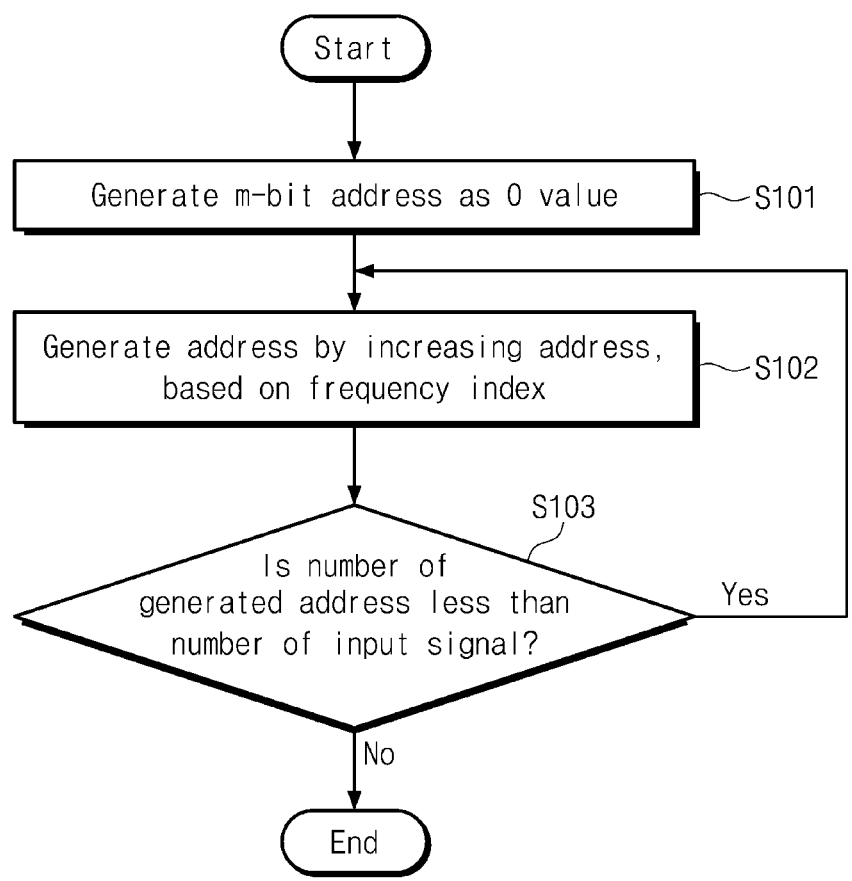
FIG. 6 is a flowchart describing an exemplary operation of an address generator of FIG. 5.

FIG. 6 is a flowchart describing an exemplary operation of an address generator of FIG. 5. Referring to FIGS. 5 and 6, in operation S101, the address generator 131 may generate m-bit address addr as 0 value. That is, the address generator 131 may generate the first address addr as 0 regardless of the frequency index "k".

In operation S102, the address generator 131 may generate the address addr by increasing the address addr, based on the frequency index "k". Specifically, the address generator 131 may generate the address addr by adding the value of the frequency index "k" to the previously generated address addr.

In operation S103, the address generator 131 may determine whether the number of generated address addr is less than the number N of the input signal x(n). When the number of generated address addr is less than the number N of input signal x(n), the address generator 131 may perform operation S102 again. That is, the address generator 131 may additionally generate an address addr. When the number of generated address addr is not less than the number N of the input signal x(n), the address generator 131 may no longer generate the address addr. That is, when the address addr is generated as many as the number N of the input signal x(n), the address generator 131 may no longer generate the address addr.

FIG. 7 is a diagram illustrating an FFT coefficient table of FIG. 5. Referring to FIG. 7, the FFT coefficient table 132 may include the 16 coefficients $c_k(n)$. Specifically, the FFT coefficient table 132 may include the coefficient $c_k(n)$ when the frequency index "k" is 1 and the number N of input signal x(n) is 16. The coefficient $c_k(n)$ of the FFT coefficient table 132 may correspond to one of the first to sixteenth coefficient indices IX1 to IX16. For example, the coefficient $c_k(0)$ corresponds to the first coefficient index IX1, the coefficient $c_k(0)$ may include the real part coefficient $c_r(0)$ and the imaginary part coefficient $c_i(0)$. In this case, the real part coefficient $c_r(0)$ may be c1 in FIG. 4, and the imaginary part coefficient $c_i(0)$ may be c5 of FIG. 4. As such, the FFT coefficient table 132 may include the coefficient values corresponding to points r0 to r15 of the real part coefficient trajectory and points i0 to i15 of the imaginary part coefficient trajectory in FIG. 4.

The FFT coefficient table 132 may receive the address addr and may output the coefficient $c_k(n)$ corresponding to the received address addr. Since there are 16 coefficients $c_k(n)$ stored in the FFT coefficient table 132, the address addr may be 4-bit. The output coefficient $c_k(n)$ may include the real part coefficient and the imaginary part coefficient. For example, when the address addr indicates 1, the FFT coefficient table 132 may output the coefficient $c_k(1)$ including the real part coefficient $c_r(1)$ and the imaginary part coefficient $c_i(1)$.

For example, when the address addr that is provided from the address generator 131 is increased by 1 (i.e., when the frequency index "k" is 1), the FFT coefficient table 132 may sequentially output the coefficient $c_k(0)$ corresponding to the first coefficient index IX1 to the coefficient $c_k(15)$ corresponding to the 16th coefficient index IX16.

For example, when the address addr provided from the address generator 131 is increased by 2 (i.e., when the frequency index "k" is 2), the FFT coefficient table 132 may output the coefficient $c_k(0)$ corresponding to the first coefficient index IX1, and then may output the coefficient $c_k(2)$ corresponding to the third coefficient index IX3. In this case, the address generator 131 may output the same coefficient $c_k(n)$ as the address addr increases.

The FFT coefficient table 132 may be implemented as a ROM (read only memory), but the inventive is not limited thereto. For example, the FFT coefficient table 132 may be implemented with a combinational logic circuit. In this case, the hardware size of the FFT coefficient table 132 may be further reduced than when the FFT coefficient table 132 is implemented with the ROM.

The coefficient $c_k(n)$ output from the FFT coefficient table 132 may be provided to the operator 120 of FIG. 2. The operator 120 may calculate the frequency component F(k)

corresponding to the frequency index "k", based on the input signal x(n) and the coefficient $c_k(n)$. For example, when the frequency index "k" is 1 and the number N of input signal x(n) is 16, the coefficients $c_k(n)$ corresponding to the first to sixteenth coefficient indices IX1 to IX16 may be sequentially output from the FFT coefficient table 132. The operator 120 may multiply the coefficient $c_k(n)$ and the input signal x(n) that are provided sequentially, and may add the multiplication results to calculate the frequency component F(1) corresponding to the frequency index 1.

As described above, the FFT coefficient generator 130 may output the coefficient $c_k(n)$ stored in the FFT coefficient table 132. Accordingly, the FFT coefficient generator 130 may quickly generate the coefficient $c_k(n)$ of the specific frequency index "k". Since the frequency component F(k) corresponding to a specific frequency index "k" is directly calculated based on the output coefficient $c_k(n)$ and the provided input signal x(n), the fast Fourier transform device 1000 may quickly calculate the specific frequency component F(k). In addition, since the fast Fourier transform device 1000 does not use internal memory, so less hardware is used, therefore, enough bits of data may be allocated such that saturation or truncation does not occur in an operation process. Therefore, the fast Fourier transform device 1000 may more accurately calculate the specific frequency component F(k).

Hereinafter, an operation in which the fast Fourier transform device 1000 of the inventive concept calculates the specific frequency component F(k), based on a FFT coefficient table having a reduced size will be described with reference to FIGS. 8 to 12.

Figure 8:
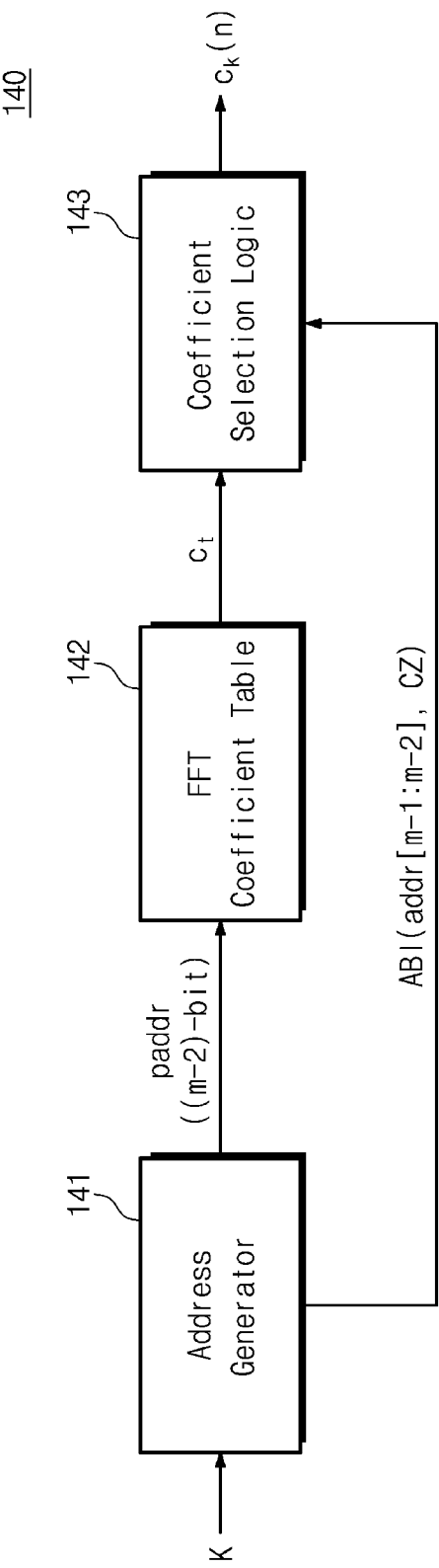
FIG. 8 is a block diagram illustrating another example of an FFT coefficient generator of FIG. 2.

FIG. 8 is a block diagram illustrating another example of an FFT coefficient generator of FIG. 2. Referring to FIG. 8, an FFT coefficient generator 140 may include an address generator 141, an FFT coefficient table 142, and coefficient selection logic 143. The address generator 141 may generate a transform address paddr, based on the frequency index "k". Specifically, the address generator 141 may generate the address addr, based on the frequency index "k", and may generate the transform address paddr corresponding to the generated address addr. The number of bits of the transform address paddr may be less than the number of bits of the address addr. As described with reference to FIG. 5, the address generator 141 may generate the m-bit address addr. In this case, the transform address paddr may be an (m-2)-bit. That is, the number of bits of the transform address paddr output from the address generator 141 may be decreased depending on the FFT coefficient table 142 having a reduced size.

For example, the address generator 141 may generate the transform address paddr depending on upper 2-bit addr [m-1:m-2] information of the address addr. In this case, the transform address paddr may be generated by using remaining bits of the address addr. The operation of the address generator 141 to generate the transform address paddr, based on the upper 2-bit addr [m-1:m-2] information of the address addr will be described in detail with reference to FIG. 9.

The address generator 141 may provide address bit information ABI of the generated address addr to the coefficient selection logic 143. The address bit information ABI may include the upper 2-bit addr [m-1:m-2] information of the generated address addr and zero bit information CZ of the generated address addr. The upper 2-bit addr [m-1:m-2] information of the generated address addr may indicate one of the first to fourth coefficient sets in FIG. 4. For example, when the upper 2-bit addr [m-1:m-2] is '00', the generated address addr may indicate the first coefficient set. The zero bit information CZ may indicate whether all of the remaining bits except for the upper 2-bit addr [m-1:m-2] are 0.

The FFT coefficient table 142 may store some coefficients $c_k(n)$ of the coefficients $c_k(n)$ of the frequency index "k". As illustrated in FIG. 4, since the coefficient values of the first to fourth coefficient sets have periodicity and symmetry, a coefficient $c_k(n)$ of other coefficient sets may be generated using one coefficient $c_k(n)$ of the first to fourth coefficient sets. Accordingly, the FFT coefficient table 142 may store one coefficient $c_k(n)$ of the first to fourth coefficient sets. For example, the FFT coefficient table 142 may store the coefficient $c_k(n)$ of the first coefficient set. However, the inventive concept is not limited to thereto.

The FFT coefficient table 142 may output the coefficient $c_k(n)$ corresponding to the transform address paddr among the stored coefficients $c_k(n)$ as a candidate coefficient $c_t$. The candidate coefficient $c_t$ may be used for generation of the coefficient $c_k(n)$ output from the FFT coefficient generator 140.

The coefficient selection logic 143 may output the coefficient $c_k(n)$, based on the address bit information ABI. In detail, when the address bit information ABI satisfies a specific condition, the coefficient selection logic 143 may output the coefficient $c_k(n)$, based on the candidate coefficient $c_t$. When the address bit information ABI satisfies another condition, the coefficient selection logic 143 may output one of the preset coefficients as the coefficient $c_k(n)$ without using the candidate coefficient $c_t$. That is, the coefficient selection logic 143 may output the coefficient $c_k(n)$ using the candidate coefficient $c_t$, based on the address bit information ABI, or may output one of the preset coefficients $c_k(n)$ as the coefficient $c_k(n)$. The operation of the coefficient selection logic 143 to output the coefficient $c_k(n)$ will be described in detail with reference to FIGS. 11 and 12.

Figure 9:
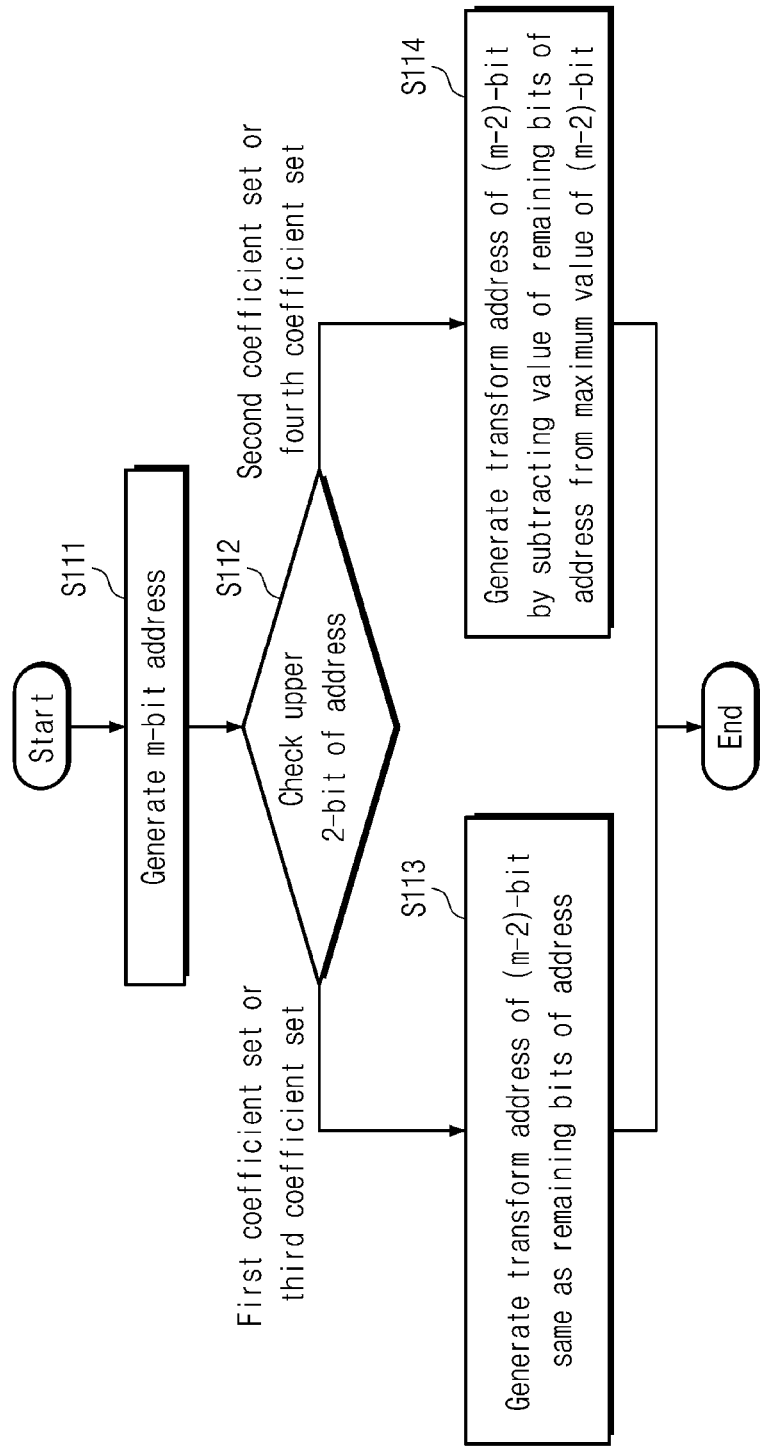
FIG. 9 is a flowchart describing an exemplary operation of an address generator of FIG. 8.

FIG. 9 is a flowchart describing an exemplary operation of an address generator of FIG. 8. Referring to FIGS. 8 and 9, in operation S111, the address generator 141 may generate the m-bit address addr. The address generator 141 may generate the address addr, as described with reference to FIG. 6.

In operation S112, the address generator 141 may check the upper 2-bit addr [m-1:m-2] of the generated address addr. The coefficient set indicated by the address addr may vary depending on the upper 2-bit addr [m-1:m-2]. For example, when the upper 2-bit addr [m-1:m-2] is '00', the generated address addr may indicate the first coefficient set. When the upper 2-bit addr [m-1:m-2] is '01', the generated address addr may indicate the second coefficient set. When the upper 2-bit addr [m-1:m-2] is '10', the generated address addr may indicate the third coefficient set. When the upper 2-bit addr [m-1:m-2] is '11', the generated address addr may indicate the fourth coefficient set.

When the upper 2-bit addr [m-1:m-2] indicates the first coefficient set or the third coefficient set, in operation S113, the address generator 141 may generate the transform address paddr the same as the remaining bits of the address addr. Accordingly, the transform address paddr of the (m-2)-bit may be generated. For example, when the address addr is '1011', because the address addr indicates the third coefficient set, the address generator 141 may generate the transform address paddr as '11'. In this case, the transform address paddr may be generated as the same as the remaining bits '11' of the address addr. That is, the transform address paddr corresponding to the third coefficient set may be generated as the same as the transform address paddr corresponding to the first coefficient set.

When the upper 2-bit addr [m-1:m-2]) indicates the second coefficient set or the fourth coefficient set, in operation S114, the address generator 141 may generate the transform address paddr by subtracting the value of the remaining bits of the address addr from a maximum value of the (m-2)-bit. Accordingly, the transform address paddr of the (m-2)-bit may be generated. For example, when the address addr is '0110', the address addr may indicate the second coefficient set. In this case, the maximum value of 2-bit may be '11', and the remaining bits of the address addr may be '10'. Therefore, the address generator 141 may subtract '10' from '11' to generate the transform address paddr as '01'. That is, the transform address paddr corresponding to the second coefficient set and the fourth coefficient set may be generated in the reverse order based on the transform address paddr corresponding to the first coefficient set.

FIG. 10 is a diagram illustrating an FFT coefficient table of FIG. 8. Referring to FIG. 10, the FFT coefficient table 142 may include four coefficients $c_k(n)$. Specifically, the FFT coefficient table 142 may include the coefficient $c_k(n)$ of the first coefficient set when the frequency index "k" is 1 and the number N of the input signal x(n) is 16. The coefficient $c_k(n)$ of the FFT coefficient table 142 may correspond to one of the first to fourth coefficient indices IX1 to IX4. For example, the coefficient $c_k(0)$ may correspond to the first coefficient index IX1. In this case, the coefficient $c_k(0)$ may include the real part coefficient $c_r(0)$ and the imaginary part coefficient $c_i(0)$. As such, the FFT coefficient table 142 may include the coefficient values corresponding to the first coefficient set of FIG. 4.

The FFT coefficient table 142 may receive the transform address paddr, and may output the candidate coefficient $c_t$ corresponding to the received transform address paddr. Since the four coefficients $c_k(n)$ are stored in the FFT coefficient table 142, the transform address paddr may be 2-bit. The output coefficient $c_k(n)$ may include the real part coefficient and the imaginary part coefficient. For example, when the transform address paddr indicates 1, the FFT coefficient table 142 may output the candidate coefficient $c_t$ including the real part coefficient $c_r(1)$ and the imaginary part coefficient $c_i(1)$.

As illustrated in FIG. 4, the coefficient $c_k(n)$ of the first coefficient set and the coefficient $c_k(n)$ of the third coefficient set have the same size and may have different signs with each other. Accordingly, when the transform address paddr of the first coefficient set and the third coefficient set are generated identically, the coefficient $c_k(n)$ of the third coefficient set may be generated using the candidate coefficients $c_t$ output from the FFT coefficient table 142.

As illustrated in FIG. 4, a size order of the coefficients $c_k(n)$ of the second coefficient set may be opposite to that of the coefficients $c_k(n)$ of the first coefficient set. For example, a size c4 of the real part of the second coefficient $c_k(5)$ of the second coefficient set will be the same as a size c4 of the real part of the fourth coefficient $c_k(3)$ of the first coefficient set. In addition, the size order of the coefficients $c_k(n)$ of the fourth coefficient set may be opposite to the size order of the coefficients $c_k(n)$ of the first coefficient set. For example, a size c2 of the imaginary part of the second coefficient $c_k(13)$ of the fourth coefficient set may be the same as a size c2 of the imaginary part of the fourth coefficient $c_k(3)$ of the first coefficient set. Accordingly, when the transform address paddr of the second coefficient set and the fourth coefficient set is generated in the reverse order based on the transform address paddr of the first coefficient set, the coefficients $c_k(n)$ of the second and fourth coefficient sets may be generated using the candidate coefficient $c_t$.

Figure 11:
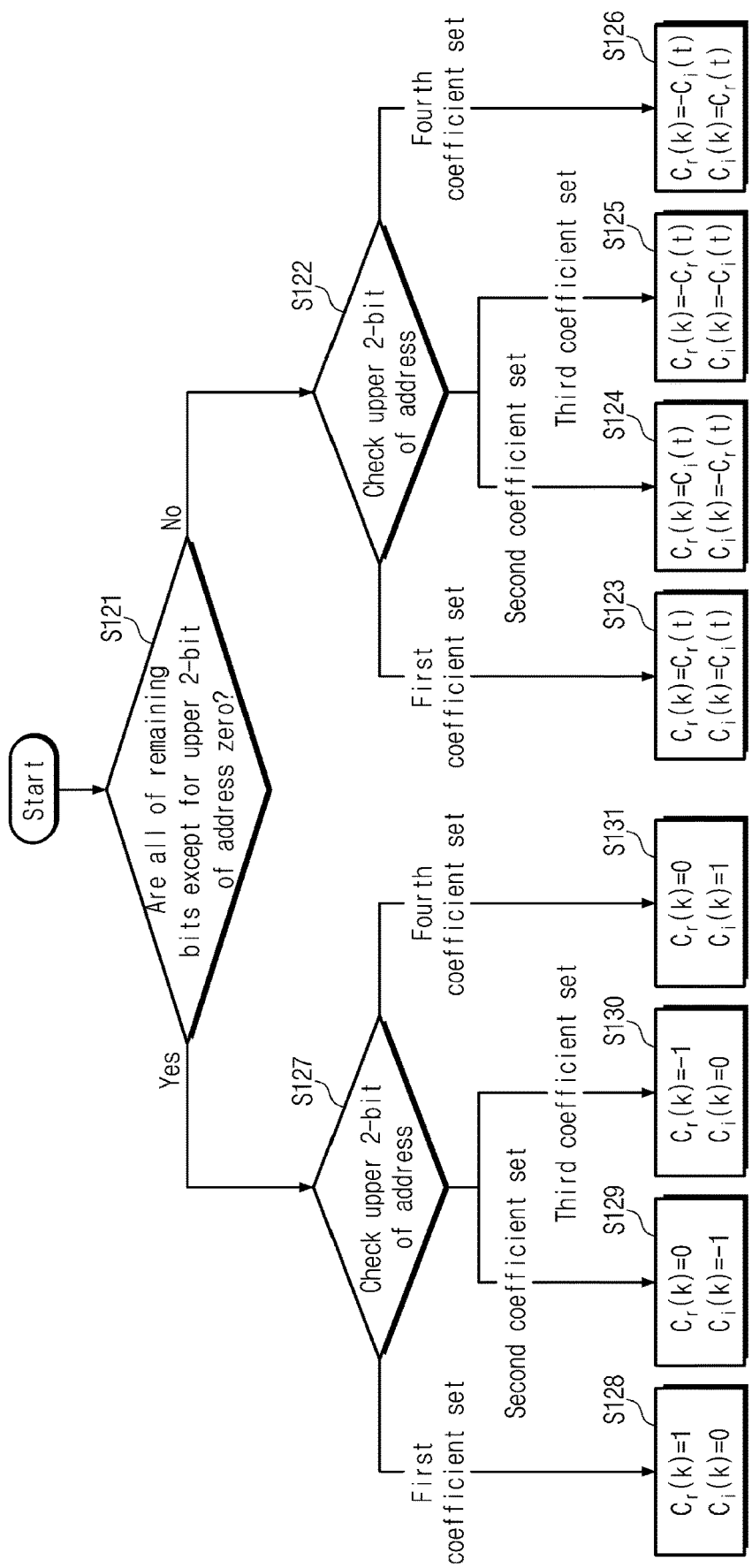
FIG. 11 is a flowchart describing an exemplary operation in which coefficient selection logic of FIG. 8 outputs real part coefficients and imaginary part coefficients.

FIG. 11 is a flowchart describing an exemplary operation in which coefficient selection logic of FIG. 8 outputs real part coefficients and imaginary part coefficients. Referring to FIGS. 8 and 11, in operation S121, the coefficient selection logic 143 may determine whether all of the remaining bits except for the upper 2-bit addr [m-1:m-2] are zero, based on the zero bit information CZ provided from the address generator 141. When all the remaining bits are 0, as illustrated in FIG. 4, the coefficients $c_k(n)$ having frequencies of 0, π/2, π, and 3π/2 may be represented. In this case, the coefficient value may be 0, 1, or −1.

When one of the remaining bits except for the upper 2-bit addr [m-1:m-2] is 1, in operation S122, the coefficient selection logic 143 may check the upper 2-bit addr [m-1:m-2]. When the upper 2-bit addr [m-1:m-2] indicates the first coefficient set, in operation S123, the coefficient selection logic 143 may output the real part coefficient $c_r(t)$ and the imaginary part coefficient $c_i(t)$ of the candidate coefficient $c_t$ output from the FFT coefficient table 142 as it is. For example, when the address addr is '0001' (i.e., when the coefficient $c_k(1)$ of the first coefficient set is indicated), the coefficient $c_k(1)$ of the first coefficient set may be output from the FFT coefficient table 142, as the candidate coefficient $c_t$. Accordingly, the coefficient selection logic 143 may output the real part coefficient $c_r(1)$ and the imaginary part coefficient $c_i(1)$ of the first coefficient set as the coefficient $c_k(1)$ as it is.

When the upper 2-bit addr [m-1:m-2] indicates the second coefficient set, in operation S124, the coefficient selection logic 143 may output the coefficient $c_k(n)$ using the candidate coefficient $c_t$ output from the FFT coefficient table 142. For example, when the address addr is '0111' (i.e., when the coefficient $c_k(7)$ of the second coefficient set is indicated), the coefficient $c_k(3)$ of the first coefficient set may be output from the FFT coefficient table 142, as the candidate coefficient $c_t$. In this case, the real part coefficient $c_r(3)$ of the output candidate coefficient $c_t$ may have the same size and opposite sign as the imaginary part coefficient $c_i(7)$ of the coefficient $c_k(7)$. The imaginary part coefficient $c_i(3)$ of the output candidate coefficient $c_t$ may have the same size and sign as the real part coefficient $c_r(7)$ of the coefficient $c_k(7)$. Accordingly, the coefficient selection logic 143 may output the imaginary part coefficient $c_i(3)$ of the candidate coefficient $c_t$ as the real part coefficient $c_r(7)$ of the coefficient $c_k(7)$, and the coefficient selection logic 143 may change a sign of the real part coefficient $c_r(3)$ of the candidate coefficient $c_t$ and output the real part coefficient $c_r(3)$ of which sign is changed, as the imaginary part coefficient $c_i(7)$ of the coefficient $c_k(7)$.

When the upper 2-bit addr [m-1:m-2] indicates the third coefficient set, in operation S125, the coefficient selection logic 143 may output the coefficient $c_k(n)$ using the candidate coefficient $c_t$ output from the FFT coefficient table 142. For example, when the address addr is '1011' (i.e., when the coefficient $c_k(11)$ of the third coefficient set is indicated), the coefficient $c_k(3)$ of the first coefficient set may be output from the FFT coefficient table 142, as the candidate coefficient $c_t$. In this case, the real part coefficient $c_r(3)$ of the output candidate coefficient $c_t$ may have the same size and different sign as the real part coefficient $c_r(11)$ of the coefficient $c_k(11)$. The imaginary part coefficient $c_i(3)$ of the output candidate coefficient $c_t$ may have the same size and opposite sign to the imaginary part coefficient $c_i(11)$ of the coefficient $c_k(11)$. Accordingly, the coefficient selection logic 143 may change the sign of the real part coefficient $c_r(3)$ of the candidate coefficient $c_t$, and may output the real part coefficient $c_r(3)$ of which sign is changed, as the real part coefficient $c_r(11)$ of the coefficient $c_k(11)$. The coefficient selection logic 143 may change the sign of the imaginary part coefficient $c_i(3)$ of the candidate coefficient $c_t$, and may output the imaginary part coefficient $c_i(3)$ of which sign is changed, as the imaginary part coefficient $c_i(11)$ of the coefficient $c_k(11)$.

When the upper 2-bit addr [m-1:m-2] indicates the fourth coefficient set, in operation S126, the coefficient selection logic 143 may output the coefficient $c_k(n)$ using the candidate coefficient $c_t$ output from the FFT coefficient table 142. For example, when the address addr is '1111' (i.e., when the coefficient $c_k(15)$ of the fourth coefficient set is indicated), the coefficient $c_k(3)$ of the first coefficient set may be output from the FFT coefficient table 142, as the candidate coefficient $c_t$. In this case, the real part coefficient $c_r(3)$ of the output candidate coefficient $c_t$ may have the same size and sign as the imaginary part coefficient $c_i(15)$ of the coefficient $c_k(15)$. The imaginary part coefficient $c_i(3)$ of the output candidate coefficient $c_t$ may have the same size and opposite sign as the real part coefficient $c_r(15)$ of the coefficient $c_k(15)$. Therefore, the coefficient selection logic 143 may change the sign of the imaginary part coefficient $c_i(3)$ of the candidate coefficient $c_t$, and may output the imaginary part coefficient $c_i(3)$ of which sign is changed, as the real part coefficient $c_r(15)$ of the coefficient $c_k(15)$. The coefficient selection logic 143 may output the real part coefficient $c_r(3)$ of the candidate coefficient $c_t$ as the imaginary part coefficient $c_i(15)$ of the coefficient $c_k(15)$.

When all of the remaining bits except for the upper 2-bit addr [m-1:m-2] are 0, in operation S127, the coefficient selection logic 143 may check the upper 2-bit addr [m-1:m-2]. When the upper 2-bit addr [m-1:m-2] indicates the first coefficient set, in operation S128, the coefficient selection logic 143 may output the coefficient $c_k(n)$ as '1' for the real part $c_r(k)$ and as '0' for the imaginary part $c_i(k)$. When the upper 2-bit addr [m-1:m-2] indicates the second coefficient set, in operation S129, the coefficient selection logic 143 may output the coefficient $c_k(n)$ as '0' for the real part $c_r(k)$ and as '−1' for the imaginary part $c_i(k)$. When the upper 2-bit addr [m-1:m-2] indicates the third coefficient set, in operation S130, the coefficient selection logic 143 may output the coefficient $c_k(n)$ as '−1' for the real part $c_r(k)$ and as '0' for the imaginary part $c_i(k)$. When the upper 2-bit addr [m-1:m-2] indicates the fourth coefficient set, in operation S131, the coefficient selection logic 143 may output the coefficient $c_k(n)$ as '1' for the real part $c_r(k)$ and as '1' for the imaginary part $c_i(k)$.

As described above, the FFT coefficient generator 140 may store fewer coefficients $c_k(n)$ in the FFT coefficient table 142 compared to the FFT coefficient generator 130 of FIG. 5. Therefore, the hardware size of the fast Fourier transform device 1000 may be smaller, and the cost may be further decreased.

FIG. 12 is a diagram illustrating another example of an FFT coefficient table of FIG. 8. Referring to FIG. 12, when the frequency index "k" is 2, an FFT coefficient table 144 may include two coefficients $c_k(n)$. Since the coefficient $c_k(n)$ has periodicity and symmetry, to calculate the frequency characteristic F(2), only two coefficients $c_k(0)$ and $c_k(2)$ of the coefficients $c_k(n)$ of the FFT coefficient table 142 of FIG. 10 may be used. Accordingly, the FFT coefficient table 144 may include only two coefficients $c_k(n)$. In this case, the transform address paddr provided from the address generator 141 may be 1-bit.

As described above, when the frequency index "k" is expressed as a multiple of power of 2, the size of the FFT coefficient table 142 may be further decreased. In this case, the frequency index "k" may be expressed as Equation 3 below.

$$k=2^a*P \qquad \text{[Equation 3]}$$

When the frequency index "k" satisfies the condition of Equation 3, the address generator 141 of FIG. 8 may generate a transform address paddr, based on the frequency index ($P=k/2^a$). In this case, the address generator 141 may generate an (m-a)-bit address addr instead of the m-bit address addr. Accordingly, the (m-2-a)-bit transform address paddr may be generated.

A fast Fourier transform device according to an embodiment of the inventive concept may quickly calculate a specific frequency response, and may more accurately calculate a specific frequency response.

A fast Fourier transform device according to an embodiment of the inventive concept may reduce the memory in which the Fourier transform coefficients are stored, and may not require a memory or shift register included in an existing fast Fourier transform device to store internal values. Accordingly, the hardware size of the fast Fourier transform device may be reduced.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents

What is claimed is:

1. A fast Fourier transform device comprising:
    an address generator, via a processor, configured to generate an address including bit information, based on a first frequency index corresponding to a first frequency;
    an FFT coefficient table, via a logic circuit, configured to output a first Fourier transform coefficient corresponding to the generated address among Fourier transform coefficients of the first frequency index; and
    an operator, via the processor, configured to calculate a frequency characteristic of an input signal associated with the first frequency, based on the input signal and the first Fourier transform coefficient,
    wherein the bit information of the generated address includes upper 2-bit information of the generated address and zero bit information.

2. The fast Fourier transform device of claim 1, wherein the address generator sequentially increases a value of the generated address, based on a value of the first frequency index.

3. The fast Fourier transform device of claim 2, wherein the number of the generated address is the same as the number of the input signal.

4. The fast Fourier transform device of claim 1, wherein the number of the Fourier transform coefficients stored in the FFT coefficient table is the same as the number of the input signal.

5. The fast Fourier transform device of claim 4, wherein each of the Fourier transform coefficients includes a real part coefficient and an imaginary part coefficient.

6. The fast Fourier transform device of claim 1, wherein, when the input signal includes a plurality of signals, the operator calculates the frequency characteristic, based on a multiplication result of a first signal corresponding to the first Fourier transform coefficient among the plurality of signals and the first Fourier transform coefficient.

7. A fast Fourier transform device comprising:
an address generator, via a processor, configured to generate an address, based on a first frequency index corresponding to a first frequency, and to generate a transform address corresponding to the generated address;
an FFT coefficient table, via a logic circuit, configured to output a first candidate coefficient corresponding to the generated transform address among Fourier transform coefficients of the first frequency index;
coefficient selection logic, via the logic circuit, configured to output a first Fourier transform coefficient, based on the first candidate coefficient or a preset coefficient depending on bit information of the generated address; and
an operator, via the processor, configured to calculate a frequency characteristic of an input signal associated with the first frequency, based on the input signal and the first Fourier transform coefficient,
wherein the bit information of the generated address includes upper 2-bit information of the generated address and zero bit information.

8. The fast Fourier transform device of claim 7, wherein the address generator sequentially increases a value of the generated address, based on a value of the first frequency index.

9. The fast Fourier transform device of claim 8, wherein the number of the generated address is the same as the number of the input signal.

10. The fast Fourier transform device of claim 7, wherein the number of the Fourier transform coefficients stored in the FFT coefficient table is less than the number of the input signal.

11. The fast Fourier transform device of claim 7, wherein the address generator generates the transform address by using remaining bits except for an upper 2-bit of the generated address, based on the upper 2-bit of the generated address.

12. The fast Fourier transform device of claim 7, wherein the upper 2-bit information of the generated address and zero bit information indicate whether all of remaining bits except for the upper 2-bit are 0.

13. The fast Fourier transform device of claim 12, wherein the coefficient selection logic outputs the first Fourier transform coefficient, based on the first candidate coefficient when at least one of the remaining bits is not 0, and outputs the first Fourier transform coefficient, based on the preset coefficient when all of the remaining bits are 0.

14. The fast Fourier transform device of claim 7, wherein, when the input signal includes a plurality of signals, the operator calculates the frequency characteristic, based on a multiplication result of a first signal corresponding to the first Fourier transform coefficient among the plurality of signals and the first Fourier transform coefficient.

* * * * *